United States Patent
Yoon et al.

(10) Patent No.: US 8,103,163 B2
(45) Date of Patent: Jan. 24, 2012

(54) METHOD OF CONTROLLING OPTICAL OUTPUT POWER AND PASSIVE OPTICAL NETWORK SYSTEM USING THE SAME

(75) Inventors: Bin-Yeong Yoon, Daejeon (KR);
Bong-Kyu Kim, Daejeon (KR);
Dong-Soo Lee, Gwangju (KR);
Mun-Seob Lee, Gwangju (KR);
Jong-Deog Kim, Gwangju (KR);
Bong-Tae Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 432 days.

(21) Appl. No.: 12/439,679

(22) PCT Filed: Aug. 22, 2007

(86) PCT No.: PCT/KR2007/004005
§ 371 (c)(1),
(2), (4) Date: Mar. 2, 2009

(87) PCT Pub. No.: WO2008/030000
PCT Pub. Date: Mar. 13, 2008

(65) Prior Publication Data
US 2009/0269051 A1  Oct. 29, 2009

(30) Foreign Application Priority Data
Sep. 7, 2006 (KR) .................. 10-2006-0086284

(51) Int. Cl.
*H04B 10/08* (2006.01)
(52) U.S. Cl. ............... 398/15; 398/10; 398/17; 398/22; 398/24
(58) Field of Classification Search .............. 398/15, 398/10, 17, 22, 24
See application file for complete search history.

(56) References Cited

U.S. PATENT DOCUMENTS

| | | | |
|---|---|---|---|
| 4,663,520 A | 5/1987 | Tanaka et al. | |
| 5,355,250 A | 10/1994 | Grasso et al. | |
| 5,837,996 A | 11/1998 | Keydar | |
| 6,594,043 B1 | 7/2003 | Bloom et al. | |
| 6,952,531 B2 | 10/2005 | Aronson et al. | |
| 2002/0024703 A1 | 2/2002 | Lee et al. | |
| 2003/0095303 A1 | 5/2003 | Cunningham et al. | |
| 2003/0194233 A1* | 10/2003 | Casanova et al. | 398/2 |
| 2003/0235205 A1* | 12/2003 | Song et al. | 370/466 |
| 2007/0140694 A1* | 6/2007 | Choi et al. | 398/71 |

FOREIGN PATENT DOCUMENTS

| | | |
|---|---|---|
| JP | 08-293835 | 11/1996 |
| JP | 2003-198480 | 7/2003 |
| KR | 2001-0027611 | 4/2001 |
| KR | 2002-0017687 | 3/2002 |

\* cited by examiner

*Primary Examiner* — Kinam Park
(74) *Attorney, Agent, or Firm* — Blakely, Sokoloff, Taylor & Zafman

(57) ABSTRACT

Provided are an optical output power control method that provides optical communication without harming the human body even when a transmission line is cut or no optical network unit (ONU) accesses a communication system, and a passive optical network (PON) system using the method. In the method, an optical signal having a predetermined period is transmitted when an optical communication system is in an abnormal state, wherein the predetermined period includes a laser-on time interval in which the optical signal has a normal power level and a laser-off time interval in which the optical signal is off or has a power level lower than the normal power level, so that the optical communication system performs optical communication without harming the human body even during the abnormal state.

19 Claims, 3 Drawing Sheets

Timer: timer with period T
T_on: Laser-on time within period T
Δt: execution time for activation procedures of ONU by OLT

METHOD OF CONTROLLING OPTICAL OUTPUT POWER AND PASSIVE OPTICAL NETWORK SYSTEM USING THE SAME

CROSS-REFERENCE TO RELATED PATENT APPLICATION

The present patent application is a national phase application of International Application No. PCT/KR2007/004005, filed Aug. 22, 2007, which application claims the benefit of Korean Patent Application No. 10-2006-0086284, filed on Sep. 7, 2006, in the Korean Intellectual Property Office, the disclosure of which is incorporated herein in its entirety by reference.

BACKGROUND OF THE INVENTION

1. Field of the Invention

The present invention relates to optical communication, and more particularly, to a method of controlling optical output power in an optical communication system and a passive optical network (PON) system using the method.

2. Description of the Related Art

Fiber To The Home (FTTH) technology is being actively studied and developed all over the world to connect a home to a telephone office using an optical fiber transmission line so as to provide integrated services including voice calls, data services, and broadcasts. The use of FTTH technology will be dramatically increased in the next several years. Particularly, PON systems using FTTH technology are the most common. Recent PON systems include asynchronous transfer mode-passive optical network (ATM-PON), broadband-passive optical network (B-PON), gigabit-passive optical network (G-PON), and Ethernet-passive optical network (E-PON) systems.

Meanwhile, user or subscriber lines or networks should be constructed so as to be able to use the PON systems. For this, transmission lines may be cut when installing new or additional communication nodes or repair existing communication nodes. In this case, users' or operators' eyes and skin can be damaged by optical radiation from the cut portion of the transmission line. Furthermore, even when the transmission line is not cut, such safety problems can occur. That is, when no subscriber, such as an optical network unit (ONU) and an optical network terminator (ONT) (hereinafter, collectively referred to as ONU), accesses the PON system, the same safety problems may occur.

Therefore, proper means or methods should be provided to protect users or operators from optical radiation when an optical communication system operates abnormally due to cut transmission lines or the nonexistence of ONU access. Particularly, protection means or methods are more important for optical communication systems having a high-power light source for providing good transmission characteristics, a number of node connections, long-distance signal transmission, etc.

When a conventional optical system is in an abnormal state, a light source of the system is shut down or is operated at a low output power level to protect users or operators. However, in this case, an additional mechanism or detector is required to detect whether the optical communication system is in an abnormal state, or to detect disconnection of a communication node. Moreover, even when nodes are normally connected to the optical communication system, the optical communication system does not normally operate until the additional mechanism or detector informs the optical communication system of the fact.

SUMMARY OF THE INVENTION

The present invention provides a method of controlling optical output power to perform optical communication without harming the human body even when a transmission line is cut or when there is no optical network unit (ONU) access, and a passive optical network (PON) system using the method.

According to an aspect of the present invention, there is provided a method of controlling a transmission power of an optical signal in an optical communication system, the method including transmitting an optical signal having a predetermined period when the optical communication system is in an abnormal state, wherein the predetermined period includes a laser-on time interval in which the optical signal has a normal power level and a laser-off time interval in which the optical signal is off or has a power level lower than the normal power level, so that the optical communication system performs an optical communication without harming the human body even in the abnormal state.

The abnormal state may be a state in which a communication between an OLT (optical line terminator) and an ONU (optical network unit or optical network terminator) of a PON (passive optical network) system is not normally performed. The transmitting of the optical signal may satisfy eye/skin safety requirements of the IEC (International Electrotechnical Commission).

The method may further include transmitting an optical signal at a normal power level when the optical communication system is in a normal state, wherein it is determined in the laser-on time interval of the predetermined period whether the optical communication system is in the normal state. The transmitting of the optical signal may be controlled by an OLT of a PON system, wherein the OLT includes: an OTRx (optical transmitter/receiver) transmitting and receiving an optical signal; and a MAC (media access control) generating and reconstructing a frame according to a standard protocol in order to transmit and receive data to and from the OTRx, and determining a state of the OTRx in order to control an optical output power of the OTRx, wherein the MAC includes an OTRx control that controls the transmitting of the optical signal having the predetermined period in the abnormal state.

The OLT may be in a plug-out mode when the optical communication system is in the abnormal state, and is in a plug-in mode when the optical communication system is in a normal state, and the OTRx control may control the OLT to change from the plug-out mode to the plug-in mode when the optical communication system goes to the normal state, and to change from the plug-in mode to the plug-out mode when the optical communication system goes to the abnormal state.

The OTRx control may control a light source to transmit the optical signal having the predetermined period in the abnormal state. The OTRx control may control a state transition between a normal state and an abnormal state and an optical power of the optical signal using a control algorithm in which it is determined whether the optical communication system is in a normal state or an abnormal state in order to transmit the optical signal having the predetermined period when the optical communication system is in the abnormal state.

The control algorithm may include: initializing a timer after turning on a light source in the plug-out mode of the OLT; comparing a time of the timer with the laser-on time interval after increasing a time of the timer by an execution time expected to be necessary for examining an activation of a normal state; and if the time of the timer is equal to or greater than the laser-on time interval, comparing the time of the timer with the predetermined period after turning off the light source and increasing the time of the timer by a predetermined time value, wherein if the time of the timer is not equal to the predetermined period, the comparing of the time of the timer with the predetermined period is repeated until the time of the timer is equal to the predetermined period, and if the time of the timer is equal to the predetermined period, the initializing of the timer and the comparing of the time of the timer with the laser-on time interval are repeated.

If the time of the timer is less than the laser-on time interval, the method may further include: after trying to activate the normal state, storing information about the trial result; and determining whether the optical communication system is in a normal state using the stored information, wherein if the optical communication system is in a normal state, the OLT changes to the plug-in mode, and if the optical communication system is not in a normal state, the increasing of the timer by an execution time and the comparing of the time of the timer with the laser-on time interval are repeated.

According to another aspect of the present invention, there is provided a PON system including: an OLT transmitting a downlink signal and receiving an uplink signal, the OLT performing the method; an ONU receiving the downlink signal from the OLT and transmitting the uplink signal to the OLT; and a node connecting the OLT and the ONU.

According to the method of controlling optical output power and the PON system using the method according to an embodiment of the present invention, an optical signal having a predetermined period is transmitted when a system is in an abnormal state. Therefore, the safety of users or operators can be ensured. Furthermore, it can be determined whether the system is in a normal state without requiring an additional device or mechanism, and if the system is in a normal state, optical communication can be automatically performed at a normal output power level.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1A:
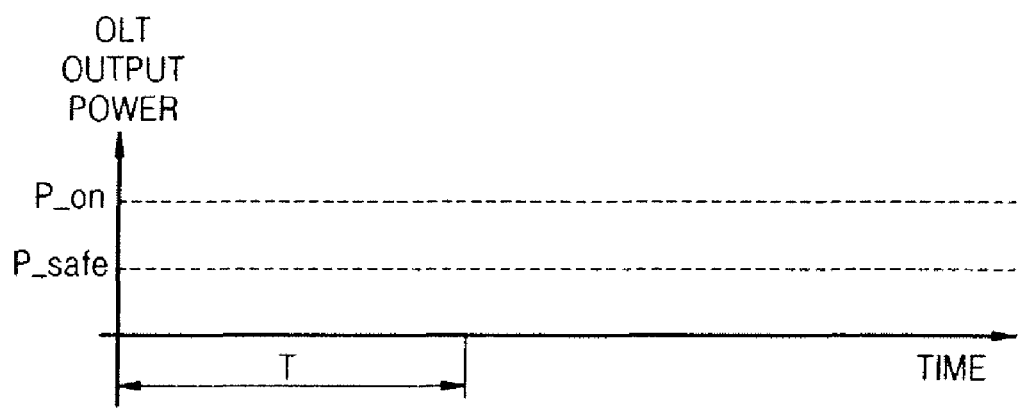
FIG. 1A is a waveform graph of a normal-state optical output signal.

The present invention will now be described more fully with reference to the accompanying drawings, in which exemplary embodiments of the invention are shown. In the drawings, the thicknesses of layers and regions are exaggerated and simplified for clarity, and like reference numerals denote like elements. Also, the terms used herein are for illustrative purposes and are not intended to limit the scope of the present invention.

FIG. 1A is a waveform graph of a normal-state optical output signal.

Referring to FIG. 1A, when a transmission line is normally connected to a network (a plug-in state), optical output power leakage is very small. Thus, in a passive optical network (PON) system, a light source of an optical line terminator (OLT) or optical network terminator (ONT) can be operated at an optical power P_on that is greater than a optical power P_safe that is safe for the eyes and skin of a person. However, when all optical network units (ONUs) are suddenly disconnected from the OLT, or the transmission line (e.g., an optical transmission line) is cut by impacts or operations such as repair work, users or operators can be exposed to high-power optical radiation and thus harmed. Therefore, when optical communication is abnormal, optical power should be shut down or lowered. However, for this, an additional device is required to determine whether the optical communication is normal or abnormal as described above.

Figure 1B:
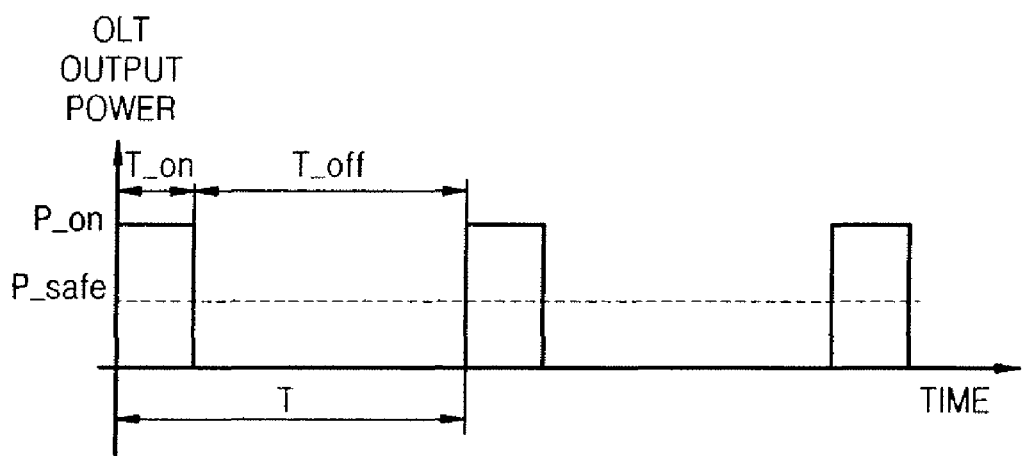
FIG. 1B is a waveform graph of an abnormal-state optical output signal by an optical output power control method according to an embodiment of the present invention.

FIG. 1B illustrates a waveform graph of an abnormal-state optical signal output by an optical output power control method according to an embodiment of the present invention.

Referring to FIG. 1B, when a transmission line is disconnected with a network (a plug-out state), an optical signal transmitted from an OLT has a predetermined period (T). In a given period (T), the optical signal has a laser-on time T_on (normal optical output power section) and a laser-off time T_off when the signal is off or weaker than during the laser-on time T_on. Since the optical signal is not output or output at a lower power level in the laser-off time T_off, data (a data bit) can be transmitted to a receiving end (i.e., an ONU) while satisfying eye/skin safety requirements of the International Electrotechnical Commission (IEC)

Since the IEC eye/skin safety requirements regulate the amount of optical radiation energy emitted during a specific time interval (e.g., 1 nano second or 10 seconds), the IEC eye/skin safety requirements can be satisfied by reducing optical radiation during the specific time interval. Thus, the optical signal can have a sufficiently high optical power level during the laser-on time T_on without violating the IEC eye/skin safety requirements by reducing the power level of the optical signal to a lower level or a zero level during the laser-off time T_off so as to reduce the total amount of optical radiation energy in a given period (T). That is, ONUs in an abnormal state can be controlled without violating the IEC eye/skin safety requirements. Therefore, an ONU can be normally controlled for optical communication directly after a node or an ONU is connected.

Figure 2:
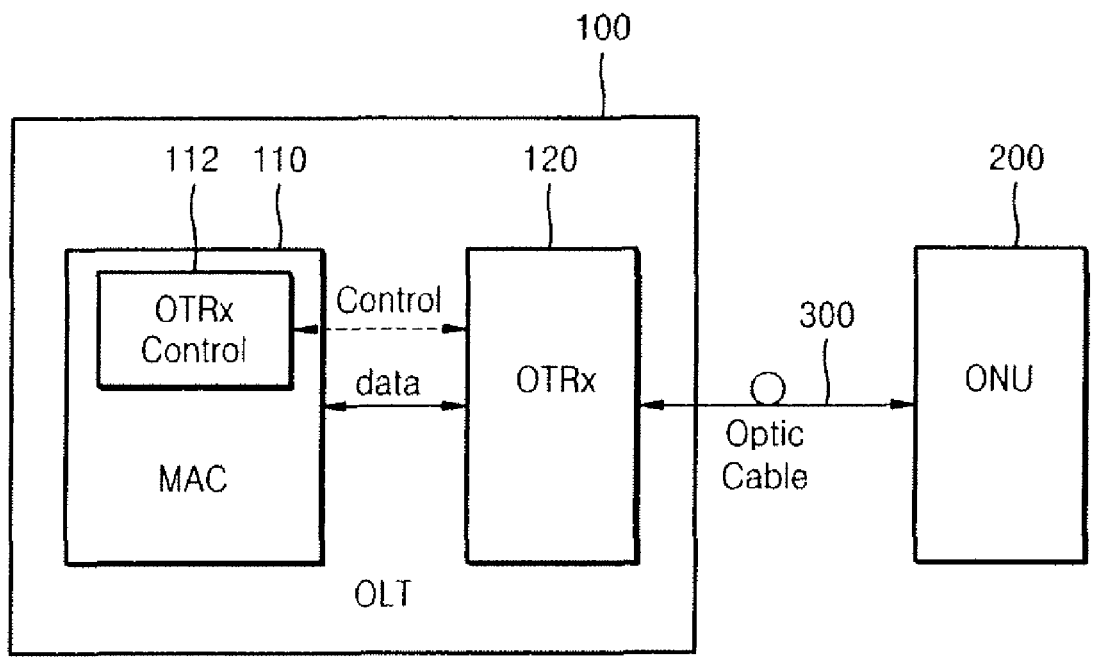
FIG. 2 is a block diagram illustrating a passive optical network (PON) system using an optical power control method according to another embodiment of the present invention.

FIG. 2 is a block diagram illustrating a PON system using an optical power control method according to another embodiment of the present invention.

Referring to FIG. 2, the PON system of the present invention includes an OLT 100 transmitting a downlink signal and receiving an uplink signal, an ONU 200 receiving the downlink signal from the OLT 100 and transmitting the uplink signal to the OLT 100, and a node connecting the OLT 100 and the ONU 200. Here, the node may be a general optical cable 300 and a remote node (RN) allowing an optical signal to branch off to the ONU 200.

The OLT 100 of the PON system includes an optical transmitter/receiver (OTRx) 120 and a media access control (MAC) 110. Generally, the OTRx 120 transmits and receives an optical signal, and the MAC 110 generates and reconstructs a frame according to a standard protocol for the OTRx 120. Also, the MAC 110 monitors the state of the OTRx 120 so as to control the optical output power of the OTRx 120. In addition, according to the current embodiment, the MAC 110 has a function for controlling the optical output power of the OTRx 120 in an abnormal optical communication state as shown in FIG. 1B. That is, the MAC 110 can determine whether the PON system is in a plug-in state or plug-out state by using a signal received from the ONU 200 and can control the optical output power of the OTRx 120 based on the determination result.

In more detail, the MAC 110 generates a MAC frame according to a protocol used by the PON system and sends the MAC frame to the OTRx 120 so as to transmit data to the ONU 200, or the MAC 110 reconstructs and processes a MAC frame using data received from the OTRx 120. In addition, according to the current embodiment of the present invention, the MAC 110 includes an OTRx control 112 for monitoring the state of the OTRx 120 and controlling the optical output power level of the OTRx 120. The OTRx control 112 monitors two states of the OLT 100 and controls the optical output power of the OLT 100 in each state as will be described with reference to FIG. 3. That is, the OTRx control 112 monitors the OLT 100 in order to determine which mode the OLT 100 is in and adjusts the optical output power level of the OLT 100 in the corresponding mode by controlling the OTRx 120 using a control channel connected to the OTRx 120.

Other components of the PON system of the current embodiment are similar to those of a general PON system. Thus, detailed descriptions of the other components will be omitted.

Figure 3:
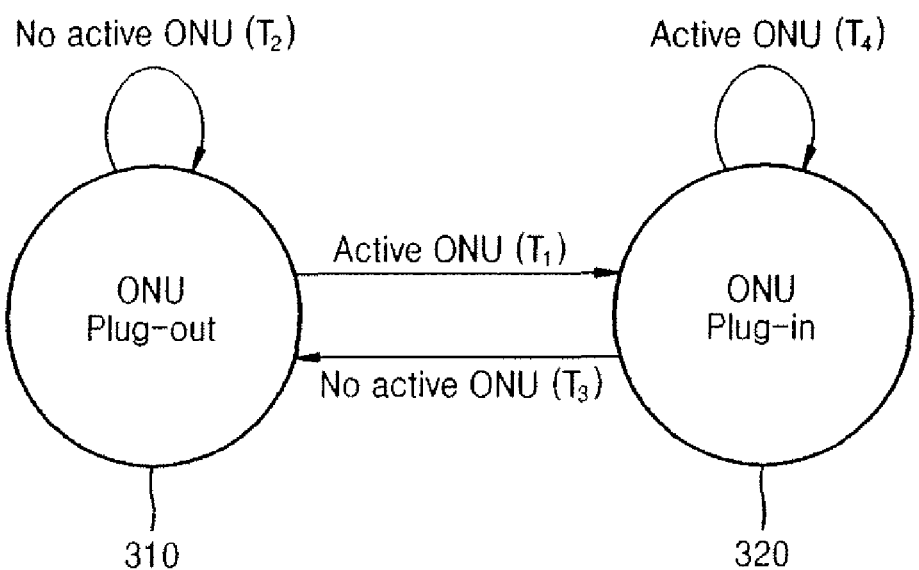
FIG. 3 is a diagram illustrating a transition between plug-in mode and plug-out mode in an optical line terminator (OLT) of the PON system illustrated in FIG. 2, according to an embodiment of the present invention.

FIG. 3 is a diagram illustrating a transition between plug-in mode and plug-out mode in the OLT 100 depicted in FIG. 2, according to an embodiment of the present invention.

Referring to FIG. 3, the OLT 100 switches between ONU plug-out mode 310 and ONU plug-in mode 320 and controls the optical output power of the OTRx 120 depending on which mode the OLT 100 is in. In the ONU plug-out mode 310, the OLT 100 is in an abnormal optical communication state. For example, in the ONU plug-out mode 310, a normally operating node is in a cut-off state or no active ONU 200 is connected to the OLT 100.

In the ONU plug-out mode 310, the OTRx control 112 controls the ORTx 120 through the control channel in order to output a signal having a waveform as shown in FIG. 1B. Meanwhile, if the OLT 100 switches to a normal optical communication state (e.g., a node is connected to the OLT 100 or an ONU 200 accesses the OLT 100) during a laser-on time T_on of a given period (T) where an optical signal is transmitted (an on-state of a laser), an ONU activation process is performed, and an OLT state control system is informed that the ONU 200 is connected to the OLT 100. Then, the OLT 100 changes to the ONU plug-in mode 320 (transition $T_1$). Here, the term ONU activation process denotes a sequence of initial procedures required for normal communication between the OLT 100 and the ONU 200 when the ONU 200 accesses the OLT 100, and the term OLT state control system denotes all parts in the OLT 100 related to a state control operation. However, when no active ONU 200 accesses the OLT 100 in the laser-on time T_on of a given period (T), the OTRx control 112 turns off the laser in the laser-off time of the given period (T). That is, the OTRx control 112 controls the OTRx 120 through the control channel so as to turn off optical output power. Thus, the OLT 100 stays in the ONU plug-out mode 310 (no active ONU $T_2$).

Meanwhile, when the OLT 100 is in the ONU plug-in mode 320, a normal optical communication state is maintained. However, when the OLT 100 enters a state where no ONU 200 accesses the OLT 100 during the ONU plug-in mode 320, the OLT 100 changes to the ONU plug-out mode 310 (transition $T_3$). That is, when no ONU 200 responds, the OLT 100 determines that no ONU 200 communicates with the OLT 100 (abnormal communication state) and changes to the plug-out mode 310 (transition $T_3$). On the other hand, the ONU 200 continues to access the OLT 100, the OLT 100 stays in the ONU plug-in mode 320 ($T_4$) and normally operates while generating an optical signal at a constant level.

Figure 4:
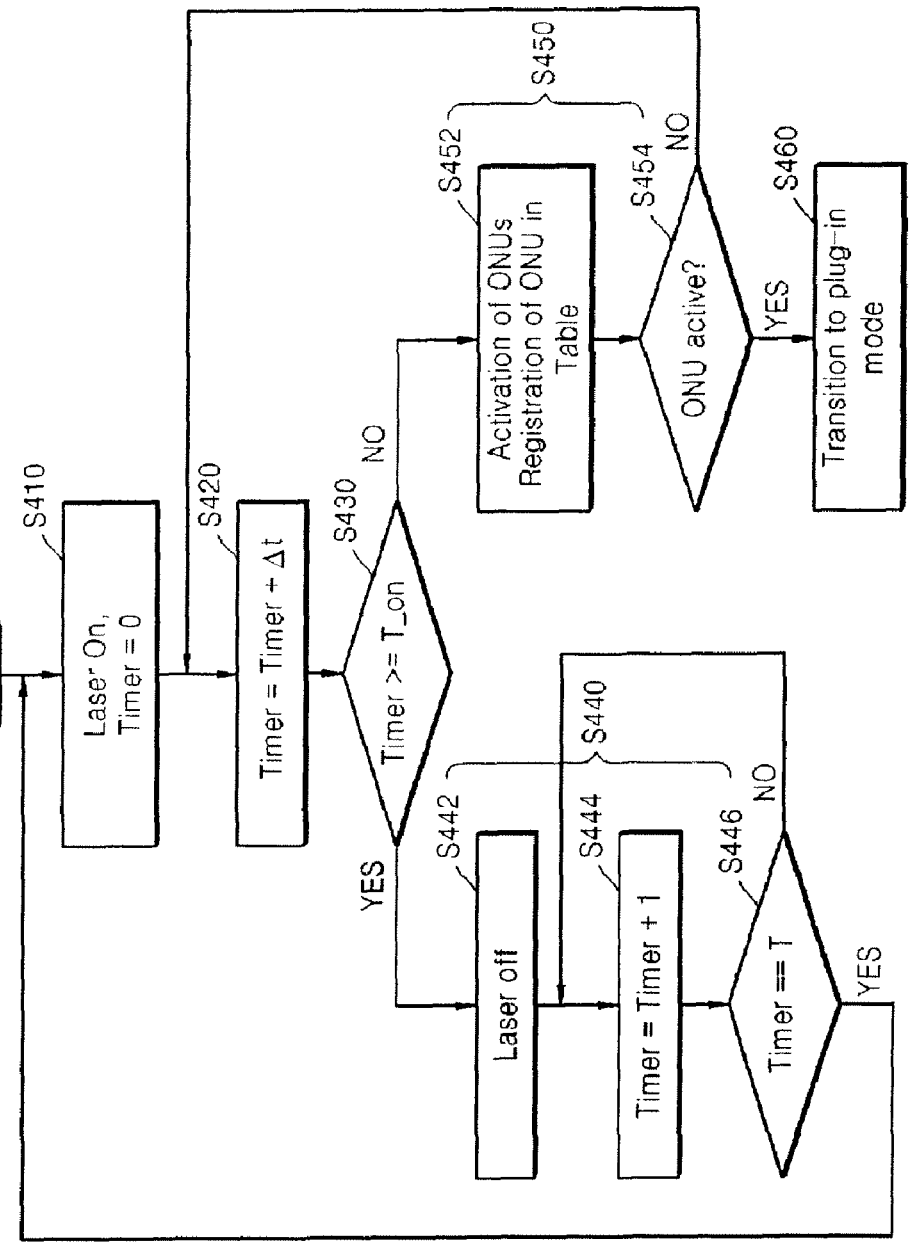
FIG. 4 illustrates a control algorithm used by an optical transmitter/receiver (OTRx) control of the OLT of FIG. 2 to control an output signal in a transitional state and an abnormal state according to an embodiment of the present invention.

FIG. 4 illustrates a control algorithm used by the OTRx control 112 of the OLT 100 to control a state transition and an output signal in an abnormal state according to an embodiment of the present invention.

Referring to FIG. 4, when the OLT 100 is in ONU plug-out mode (i.e., when no active ONU 200 accesses the OLT 100), a laser or a light source is turned on, and a clock timer having a period (T) is initialized in operation S410. Here, the clock timer is used to measure a laser-on time T_on and a laser-off time T_off in the ONU plug-out mode. Generally, the clock timer is initialized by being set to zero.

In operation S420, the set time of the clock timer is increased by an expected execution time Δt. The execution time Δt is the expected time necessary for determining whether the OLT 100 performs ONU activation procedures for the ONU 200. In operation 430, the time of the clock timer is compared with the laser-on time T_on and the next operation is proceeded to according to the comparison results.

If the time of the clock timer is equal to or greater than the laser-on time T_on, a laser is turned off for a predetermined time in operation S440. In detail, if the time of the clock timer exceeds the laser-on time T_on and reaches the laser-off time T_off, the laser is turned off so as to interrupt transmission of an optical signal. The laser-off operation S440 includes the following sub-operations.

If the time of the clock timer is equal to or greater than the laser-on time T_on, the laser is immediately turned off in sub-operation S442. In sub-operation S444, the time of the clock timer is increased by a unit time (i.e., by the resolution of the clock timer). A "1" present in the algorithm of FIG. 4 can be various time intervals such as 1 nanosecond or 1 millisecond depending on the wavelength of an optical signal output from the OLT 100 or other factors. In the sub-operation S446, the time of the clock timer is compared with a predetermined period (T). In the current embodiment of the present invention, an optical signal is transmitted in a predetermined section of the predetermined period (T), and thus the laser-off time T_off does not exceed the predetermined period (T). Therefore, if the time of the clock timer is not equal to the predetermined period (T) (i.e., if the time of the clock timer is less than the predetermined period (T)), the algorithm goes back to sub-operation S444 so as to increase the time of the clock timer. When the time of the clock timer is equal to the predetermined period (T), the algorithm goes back to operation S410 in order to turn on the laser.

Meanwhile, if the time of the clock timer is less than the laser-on time T_on, there is an attempt made to activate the ONU 200 in operation 450. That is, if the time of the clock timer is within the laser-on time T_on, the laser is maintained in the turned-on state, and an access state of the ONU 200 is examined in order to perform ONU activation procedures.

The ONU activation operation 450 may include the following sub-operations. In sub-operation S452, the access state of the ONU 200 is examined, and if the ONU 200 accesses the OLT 100, ONU activation procedures are performed and the ONU 200 is registered in an ONU table. In sub-operation S 454, it is determined whether a registered ONU 200 exists (i.e., whether an active ONU 200 exists).

If a registered ONU 200 exists, the OLT 100 changes to ONU plug-in mode since optical communication can be normally performed. If not, the OLT 100 stays in the ONU plug-out mode, and the algorithm goes back to operation S420.

In the method of controlling optical output power and the PON system using the method according to an embodiment of the present invention, an optical signal having a predetermined period is transmitted using the above-described algorithm, so that the safety of users or operators can be ensured during an abnormal optical communication state, and the access state of an ONU can be examined. Therefore, an additional device required in the conventional method and system is not required, and users or operators can be safely protected from optical radiation caused by, for example, transmission line breakage.

The invention can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves such as data transmission through the Internet. The computer-readable recording medium can also be distributed over network-coupled computer systems so that the computer-readable code is stored and executed in a distributed fashion.

As described above, according to the method of controlling optical output power and the PON system using the method of the present invention, an optical signal having a predetermined period is transmitted, so that the safety of users or operators can be ensured in an abnormal optical communication state, and the access state of an ONU can be examined. Therefore, the present invention can be usefully used in the field of optical communications.

Moreover, the PON system of the present invention includes the OLT with OTRx control to perform the optical output power control method. Therefore, the PON system can perform optical communications while ensuring users' or operators' safety even during an abnormal communication state without requiring an additional device or mechanism.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a transmission power of an optical signal in an optical communication system, the method comprising transmitting an optical signal having a predetermined period when the optical communication system is in an abnormal state,
    wherein the predetermined period includes a laser-on time interval in which the optical signal has a normal power level and a laser-off time interval in which the optical signal is off or has a power level lower than the normal power level, so that the optical communication system performs an optical communication without harming a human body even in the abnormal state,
    wherein the transmitting of the optical signal is controlled by an OLT including an OTRx (optical transmitter/receiver) and a MAC (media access control) in a PON system,
    wherein the MAC includes an OTRx control that controls the transmitting of the optical signal having the predetermined period in the abnormal state.

2. The method of claim 1, wherein the transmitting of the optical signal satisfies eye/skin safety requirements of the IEC (International Electrotechnical Commission).

3. The method of claim 1, wherein the abnormal state is a state in which a communication between an OLT (optical line terminator) and an ONU (optical network unit or optical network terminator) of a PON (passive optical network) system is not normally performed.

4. The method of claim 1, further comprising transmitting the optical signal at a normal power level when the optical communication system is in a normal state,
    wherein it is determined in the laser-on time interval of the predetermined period whether the optical communication system is in the normal state.

5. The method of claim 1,
    wherein the OTRx transmits and receives an optical signal, and the MAC generates, reconstructs a frame according to a standard protocol in order to transmit and receive data to and from the OTRx, and determines a state of the OTRx in order to control an optical output power of the OTRx.

6. The method of claim 5, wherein the OLT is in a plug-out mode when the optical communication system is in the abnormal state, and is in a plug-in mode when the optical communication system is in a normal state, and
    the OTRx control controls the OLT to change from the plug-out mode to the plug-in mode when the optical communication system goes to the normal state, and to change from the plug-in mode to the plug-out mode when the optical communication system goes to the abnormal state.

7. The method of claim 6, wherein the OTRx control controls a light source to transmit the optical signal having the predetermined period in the abnormal state.

8. The method of claim 6, wherein the OTRx control controls a state transition between a normal state and an abnormal state and an optical power of the optical signal using a control algorithm in which it is determined whether the optical communication system is in a normal state or an abnormal state in order to transmit the optical signal having the predetermined period when the optical communication system is in the abnormal state.

9. The method of claim 8, wherein the control algorithm comprises:
    initializing a timer after turning on a light source in the plug-out mode of the OLT;
        comparing a time of the timer with the laser-on time interval after increasing a time of the timer by an execution time expected to he necessary for examining an activation of a normal state; and
        if the time of the timer is equal to or greater than the laser-on time interval, comparing the time of the timer with the predetermined period after turning off the light source and increasing the time of the timer by a predetermined time value,
    wherein if the time of the timer is not equal to the predetermined period, the comparing of the time of the timer with the predetermined period is repeated until the time of the timer is equal to the predetermined period, and if the time of the timer is equal to the predetermined period, the initializing of the timer and the comparing of the time of the timer with the laser-on time interval are repeated.

10. The method of claim 9, wherein if the of the timer is less than the laser-on time interval, the method further comprises:
    after trying to activate the normal state, storing information about the trial result; and
    determining whether the optical communication system is in a normal state using the stored information,
    wherein if the optical communication system is in a normal state, the OLT changes to the plug-in mode, and
    if the optical communication system is not in a normal state, the increasing of the timer by an execution time and the comparing of the time of the timer with the laser-on time interval are repeated.

11. The method of claim 9, wherein the timer measures the laser-on time interval and the laser-off time interval and is set to zero when the timer is initialized.

12. The method of claim 9, wherein the predetermined time value is a resolution of the timer.

13. A PON system comprising:
    an OLT transmitting a downlink signal and receiving an uplink signal, the OLT
    transmitting an optical signal having a predetermined period when the optical communication system is in an abnormal state,
    wherein the predetermined period includes a laser-on time interval in which the optical signal has a normal power level and a laser-off time interval in which the optical signal is off or has a power level lower than the normal power level, so that the optical communication system performs an optical communication without harming a human body even in e abnormal state;
    an ONU receiving, the downlink signal from the OLT and transmitting the uplink signal to the OLT; and
    a node connecting the OLT and the ONU
    wherein the OLT includes:
    an OTRx transmitting and receiving an optical signal; and
    a MAC generating and reconstructing a frame according to a standard protocol in order to transmit and receive data to and from the OTRx, and determining a state of the OTRx in order to control an optical output power of the OTRx,
    wherein the MAC includes an OTRx control that controls the transmitting of the optical signal having the predetermined period in the abnormal state.

14. The PON system of claim 13, wherein the OLT performs the method while satisfying eye/skin safety requirements of the IEC.

15. The PON system of claim 13, wherein the OLT transmits an optical signal at a normal power level when the optical communication system is in a normal state,
wherein it is determined in the laser-on time interval of the predetermined period whether the optical communication system is in the normal state.

16. The PON system of claim 13, wherein the OLT is in a plug-out mode when the optical communication system is in the abnormal ate and in a plug-in mode when the optical communication system is in a normal state, and
    the OTRx control controls the OLT to change from the plug-out mode to the plug-in mode when the optical communication system goes to the normal state, and to change from the plug-in mode to the plug-out mode when the optical communication system goes to the abnormal state.

17. The PON system of claim 16, wherein the OTRx control controls a state transition between a normal state and an abnormal state and an optical power of the optical signal using a control algorithm in which it is determined whether the optical communication system is in a normal state or an abnormal state in order to transmit the optical signal having the predetermined period when the optical communication system is in the abnormal state.

18. The PON system of claim 17, wherein the control algorithm comprises: initializing a timer after turning on a light source (laser) in the plug-out mode of the OLT;
    comparing a time of the timer with the laser-on time interval after increasing a time of the timer by an execution time expected to be necessary for examining an activation of a normal state; and
    if the time of the timer is equal to or greater than the laser-on time interval, comparing the time of the timer with the predetermined period after turning off the light source and increasing the time of the timer by a predetermine time value;
    wherein if the time of the timer is not equal to the predetermined period, the comparing of the time of the timer with the predetermined period is repeated until the time of the timer is equal to the predetermined period, and
    if the time of the timer is equal to the predetermined period, the initializing of the timer and the comparing of the time of the timer with the laser-on time interval are repeated.

19. The PON system of claim 18, wherein if the time of the timer is less than the laser-on time interval, the control algorithm further comprises:
    after trying to activate the normal state, storing information about the trial result; and
    determining whether the optical communication system is in a normal state using the stored information,
    wherein if the optical communication system is in a normal state, the OLT changes to the plug-in mode, and
    if the optical communication system is not in a normal state, the increasing of the time of the timer by an execution time and the comparing of the time of the timer with the laser-on time interval are repeated.

* * * * *